(12) United States Patent
Aumiller

(10) Patent No.: US 10,267,436 B2
(45) Date of Patent: Apr. 23, 2019

(54) HOLDING DEVICE FOR HOLDING A CABLE

(75) Inventor: Markus Aumiller, Hunzenschwil (CH)

(73) Assignee: AGRO AG, Hunzenschwil (CH)

( * ) Notice: Subject to any disclaimer, the term of this patent is extended or adjusted under 35 U.S.C. 154(b) by 440 days.

(21) Appl. No.: 13/990,718

(22) PCT Filed: Oct. 7, 2011

(86) PCT No.: PCT/EP2011/067566
§ 371 (c)(1),
(2), (4) Date: May 30, 2013

(87) PCT Pub. No.: WO2012/072318
PCT Pub. Date: Jun. 7, 2012

(65) Prior Publication Data
US 2013/0256467 A1    Oct. 3, 2013

(30) Foreign Application Priority Data

Dec. 1, 2010  (CH) ...................................... 2018/10

(51) Int. Cl.
*F16L 3/12*   (2006.01)
*H01R 13/187*   (2006.01)
(Continued)

(52) U.S. Cl.
CPC .............. *F16L 3/12* (2013.01); *H01R 9/0527* (2013.01); *H01R 13/187* (2013.01);
(Continued)

(58) Field of Classification Search
CPC ........... F16L 3/12; F16L 37/144; Y10T 24/14; Y10T 279/17358; H02G 3/088;
(Continued)

(56) References Cited

U.S. PATENT DOCUMENTS 3,539,954 A * 11/1970 Camire .............. H01R 13/7197
                                                    333/183
4,022,966 A   5/1977 Gajajiva
(Continued)

FOREIGN PATENT DOCUMENTS

DE         196 15 158 A1    10/1997
DE    10 2006 052 090 A1     5/2008
(Continued)

*Primary Examiner* — Jonathan Liu
*Assistant Examiner* — Taylor L Morris
(74) *Attorney, Agent, or Firm* — Pauley Erickson & Kottis

(57) ABSTRACT

The invention relates to a holding device for holding a cable, comprising a sleeve-shaped base part (1), a connection part (2) that can be connected to the base part (1), and a clamp part (3) which can be elastically clamped and is disposed between base part (1) and connection part (2). The clamp part (3) comprises elastically clampable clamp braces (7) for embracing a cable and at least one clamping wing (9) that protrudes in an arc-shaped manner from a clamp brace (7) and supports the clamp part (3) in an elastically clamped manner on an inner circumferential surface of the base part (1). The clamp braces (7) and the clamping wings (9) of the clamp part (3) are in continuous contact with each other.

17 Claims, 1 Drawing Sheet

(51) Int. Cl.
*H01R 9/05* (2006.01)
*H01R 13/6583* (2011.01)
*H02G 3/06* (2006.01)
*H01R 13/11* (2006.01)

(52) U.S. Cl.
CPC ....... *H01R 13/6583* (2013.01); *H02G 3/0666* (2013.01); *H02G 3/0675* (2013.01); *H01R 13/111* (2013.01)

(58) Field of Classification Search
CPC .. H02G 3/0666; H02G 3/065; H01R 13/5812; H01R 43/16; H01R 13/187; H01R 13/65802; H01R 24/564; H01R 9/0527; H01R 13/111; H01R 13/6583
USPC .......... 248/49, 65, 74.1; 174/650, 652, 653, 174/656, 664, 68.1, 72 A
See application file for complete search history.

(56) References Cited

U.S. PATENT DOCUMENTS

| | | | | |
|---|---|---|---|---|
| 4,106,839 A * | 8/1978 | Cooper | | 439/607.18 |
| 4,549,755 A * | 10/1985 | Kot et al. | | 285/341 |
| 4,767,360 A * | 8/1988 | Bonhomme | H01R 13/111 | 439/593 |
| 4,854,891 A * | 8/1989 | Kamei | H01R 13/6592 | 439/462 |
| 5,059,747 A * | 10/1991 | Bawa et al. | | 174/655 |
| 5,069,424 A * | 12/1991 | Dennany, Jr. | F16L 37/0982 | 251/149.1 |
| 5,199,891 A * | 4/1993 | Reed | H01R 9/034 | 439/452 |
| 5,211,587 A * | 5/1993 | Alden | H01R 13/111 | 439/843 |
| 5,346,403 A * | 9/1994 | Hyzin | H01R 13/65802 | 439/95 |
| 5,393,021 A * | 2/1995 | Nelson | F16L 3/127 | 248/71 |
| 5,423,577 A * | 6/1995 | Ketcham | F16L 37/088 | 277/619 |
| 5,683,117 A * | 11/1997 | Corbett | F16L 37/088 | 285/24 |
| 5,691,506 A * | 11/1997 | Miyazaki et al. | | 174/652 |
| 5,730,481 A * | 3/1998 | Szabo | F16L 37/144 | 285/305 |
| 5,735,716 A * | 4/1998 | Bilezikjian | H01R 13/187 | 439/843 |
| 5,823,813 A * | 10/1998 | Dye | H01R 13/6277 | 439/347 |
| 5,938,475 A | 8/1999 | Penner et al. | | |
| 5,951,063 A * | 9/1999 | Szabo | F16L 37/144 | 285/303 |
| 5,965,847 A * | 10/1999 | Tanaka | H01R 9/0527 | 174/84 R |
| 6,179,345 B1 * | 1/2001 | Gensert | F01N 13/1811 | 285/305 |
| 6,299,489 B1 * | 10/2001 | Phillips | H01R 13/111 | 439/252 |
| 6,540,263 B1 * | 4/2003 | Sausner | F16L 37/144 | 285/305 |
| 6,634,679 B1 * | 10/2003 | Stieler | F16L 37/144 | 285/308 |
| 6,639,146 B1 * | 10/2003 | Chiu | H01R 13/6592 | 174/359 |
| 6,755,675 B2 * | 6/2004 | Szabo et al. | | 439/191 |
| 6,805,383 B2 * | 10/2004 | Ostrander | F16L 37/144 | 285/149.1 |
| 6,825,417 B2 * | 11/2004 | Ball | B60R 16/0215 | 174/74 R |
| 7,021,967 B2 * | 4/2006 | Mullin | H01R 9/037 | 439/583 |
| 7,090,174 B2 * | 8/2006 | Korczak | F16B 21/075 | 248/58 |
| 7,114,987 B2 * | 10/2006 | Nad | H01R 13/5808 | 439/449 |
| 7,293,745 B2 * | 11/2007 | Catapano | H02G 3/30 | 248/61 |
| 7,445,249 B2 * | 11/2008 | Feger | F16L 37/144 | 285/305 |
| 7,495,184 B1 * | 2/2009 | Gretz | | 174/655 |
| 7,625,224 B2 * | 12/2009 | Jaouen | H01R 13/65802 | 439/98 |
| 7,677,608 B2 * | 3/2010 | Takayanagi | F16L 37/144 | 285/305 |
| 7,866,711 B2 * | 1/2011 | Kerin | F16L 25/01 | 285/308 |
| 2008/0020637 A1 * | 1/2008 | Montena | H01R 9/0524 | 439/583 |
| 2008/0048442 A1 * | 2/2008 | Kerin | F16L 25/01 | 285/305 |
| 2009/0294602 A1 * | 12/2009 | Korczak | F16L 3/127 | 248/74.2 |
| 2010/0081321 A1 * | 4/2010 | Malloy et al. | | 439/578 |
| 2011/0271515 A1 * | 11/2011 | Poder | F16L 21/03 | 29/525.01 |

FOREIGN PATENT DOCUMENTS

| | | | |
|---|---|---|---|
| DE | 202009013522 U1 * | 12/2009 | ............... H02G 3/06 |
| DE | 20 2009 013 552 U1 | 1/2010 | |
| EP | 0 841 718 A2 | 5/1998 | |
| EP | 1 526 620 A2 | 4/2005 | |
| EP | 1 783 876 A2 | 5/2007 | |

* cited by examiner

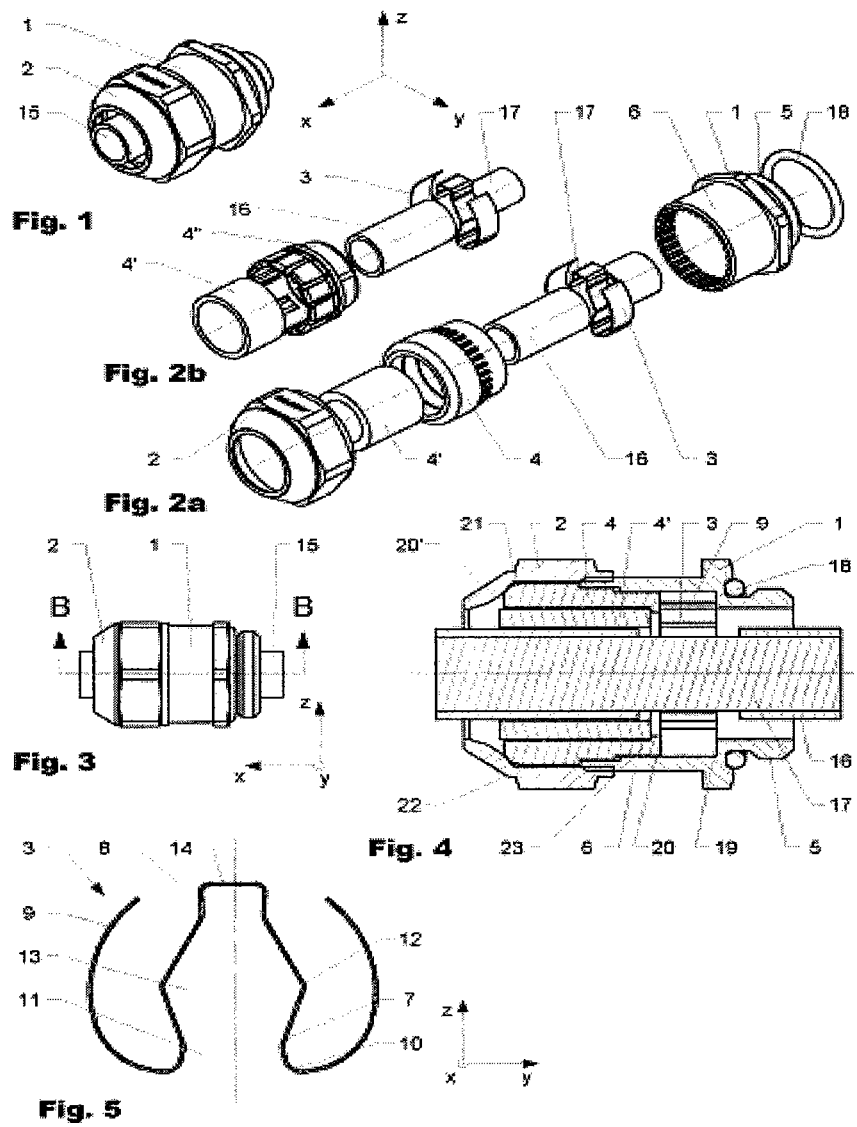

HOLDING DEVICE FOR HOLDING A CABLE

BACKGROUND OF THE INVENTION

Field of the Invention

The present invention relates to a holding apparatus for holding a cable, particularly a grounding cable or shielding cable, as typically used for cable passages or cable introductions in housings of devices or control cabinets.

Discussion of Related Art

Such holding apparatuses can serve, on the one hand, for tension relief with a sealing function of the cable, and, on the other hand, for electromagnetic shielding, and for conducting away line interference. For this purpose, the cable is axially secured in the holding apparatus, and an electrical contact with a cable shielding, which generally consists of a wire braid disposed underneath an outer insulation of the cable, is produced. Common holding apparatuses generally comprise a sleeve-shaped base part that is disposed over a cable, a contact part and/or holding part, which holds the cable and, if necessary, can produce a contact with the cable shielding, and a connector part that can be connected with the base part and positions the contact part/holding part in the base part. The base part can be configured as a screw sleeve and can enter into a screw connection with a housing, for example, so that the cable is fixed in place on the housing.

From EP 1526620 B1 or DE 202009013522 U1, for example, cable screw connections for shielded cables are known, in which a contact part is provided with multiple elastic contact brackets disposed in ring shape, which run essentially at a slant to the longitudinal cable direction, with the bracket ends being directed toward the cable axis. The contact part is disposed within a threaded connector, which can be screwed into a housing. The contact part enters into an electrical connection with the threaded connector. A pressure element, such as a retainer nut, can be screwed onto the threaded connector, thereby narrowing an inside diameter of a holder or seal, for example. In this connection, the pressure element can also act on the contact brackets in such a manner that their ends are pressed radially inward onto the cable shielding, thereby making it possible to produce an electrical contact with the shielding. Alternatively, the bracket ends can already drag over the cable when the cable is pushed in, and be bent upward by it.

To affix the cable screw connection to the cable, the cable mantle must be removed in certain places, so that the cable shielding is exposed. After the shielding is exposed, the cable is pushed through the contact bracket ring in the axial direction, and in the case of larger cables, for example, the contact brackets can rub on the wire braid in the planned clamping region. In this connection, the danger exists that individual regions of the braid are damaged or pushed back, and that the electrical contact is disadvantageously impaired. Furthermore, the cable cannot be rotated within the contact bracket ring, because when this happens, the edges of the brackets could also damage the braid. Furthermore, the cable cannot be pulled back out of the contact bracket ring, because in this case, the tips of the brackets ends would bore into the braid and could damage it. For this reason, the braid ends are generally covered in a separate work step, for example with an adhesive tape or with conductive material. Such a type of cable screw connection is also evident from U.S. Pat. No. 4,022,966. In the case of cables having a small diameter, contact between the threaded connector and the cable is generally ensured when the cable is already accommodated in the interior of the threaded connector and the retainer nut, and the contact brackets are pressed down by means of the retainer nut. Because no defined axial positioning is provided, the possibility exists that the contact brackets are fixed in place not above an exposed braid region, but rather above the cable mantling, and no electrical contacting takes place. In the case of very thin cables, in particular, there is the risk that a radial movement of the contact brackets when the threaded connector and the retainer nut are screwed together is not sufficient to press the contact bracket ends down onto the braid.

In DE 102006052090 A1, a cable screw connection for shielded cables is shown, which is suitable for accommodating multiple cables. A double-threaded connector can be inserted into a housing with a first thread. A second thread is screwed together with a cap nut, and thereby, with an increasing screw connection, cross-sections of multiple cable passages in the squeeze seal are narrowed, and therefore the cables are axially fixed in place. To produce a connection of the cable shield with the double-thread connector, a contact insert is provided, which has a plurality of electrically conductive clamping clips, which are arranged by a holding pin to produce multiple clamping arrangements. The clamping clips are disposed around the holding pin in the circumference direction, so that two arms of adjacent clamp clips, in each instance, form a clamping arrangement, in each instance, and can be elastically bent open relative to the holding pin, to accommodate a cable. The ends of the clamping clip arms are bent inward, so that the totality of the clamping clips disposed in the circumference direction form a contact surface for a contact with the double-threaded connector.

In this embodiment of a cable screw connection, multiple clamping clips are required not only to contact the cable shielding but also to contact the double-threaded connector, and these must be mounted in an additional holder, so that they can be held together by the latter. A clamping clip alone can neither accommodate a cable nor ensure secure positioning within the double-threaded connector.

SUMMARY OF THE INVENTION

It is a task of the present invention to create a holding apparatus that allows reliable holding and positioning of a cable in the holding apparatus, ensures reliable contacting between a cable shielding and the holding apparatus, allows flexible and simple installation on the cable, makes do with few components, and can be produced in cost-advantageous manner.

This task is accomplished by the invention by means of a holding apparatus according to claim 1. Advantageous embodiments and further exemplary embodiments are described in the dependent claims.

A holding apparatus for holding a cable, according to the present invention, comprises a sleeve-shaped base part, a connector part that can be connected with the base part, and an elastically tensile clamp part that is disposed and can be held between base part and connector part. The clamp part has elastically tensile clamp braces that are suitable for clutching a cable, and at least one clamping wing that projects away from a clamp brace in arc-like manner and projects around it at least in part. The at least one clamping wing supports the clamp part, elastically clamped against an inside circumference surface of the base part. Clamp braces and clamping wings of the clamp part continuously follow one another or make a direct transition into one another. This means that the clamp part is formed by a continuous arched, bent, or otherwise shaped material line from which the clamp braces and clamping wings are formed, one following the other. The clamp part is preferably configured in one piece. However, the clamp part can also be in multiple parts, as long as it is configured along a continuous line and the individual parts are firmly connected with one another. Fundamentally, however, multiple separate elements can be firmly connected to form a clamp part, as long as a continuous progression of the clamp braces and clamping wings exists, in this connection.

The sleeve-shaped base part can be configured, for example, as a threaded connector, which has a first thread for a connection with a housing and a second thread for a connection with the connector part. The connector part can be provided, for example, as a retainer nut that can be screwed onto the threaded connector. However, a different type of connection between base part and connector part, such as a plug-in connection, can also be provided, which provides for axial movement between base part and connector part relative to the connection.

In order to fasten the holding apparatus according to the invention onto a cable, particularly onto a shielded cable, the cable shielding is exposed in a region of the cable. This can happen at a cable end, but also in a center region of a cable. Subsequently, the clamp part is disposed on the exposed cable region. For this purpose, the elastically tensile clamp braces are spread apart, in order to be able to accommodate the cable between them. Preferably, the cable is laid between the clamp braces radially in the longitudinal direction of the clamp braces, or radially relative to the bending of the clamping wings, i.e. radially relative to the cable axis. Fundamentally, the cable can also be introduced between the clamp braces in the longitudinal direction, in other words perpendicular to them, for example if a clamp opening is widened by means of compression of the clamp braces. In this connection, the clamp part is positioned on the cable shielding in a clamped position. The arc-like clamping wings are elastically biased, for example pressed radially inward in the direction of the clamp braces, so that the entire circumference of the clamp part is smaller than the inside circumference of the base part. In this biased state, the clamp part with the cable clamped in it can be introduced into the base part. In the interior of the base part, the clamping wings spring radially toward the outside due to their bias force, and are pressed against the inside circumference surface of the base part. To fix the clamp part in place within the base part, the connector part is connected with the base part in the axial direction. The material used is preferably electrically conductive, so that the clamp part can be used not only as a holding part but also as a contact part for an electrical connection, as described above. A spring steel or an elastic plastic that is provided with an electrically conductive coating or itself has electrically conductive properties, for example, is used as the material.

The holding apparatus according to the invention grasps a cable or a cable shielding with the longitudinal sides of the clamp braces; in this way, the cable or the shielding is prevented from being damaged by edges or points during introduction into the clamp part. Furthermore, the cable can easily be rotated or pushed into a desired position in the clamp part. Correct contacting can be ensured by means of affixing the clamp part on the cable shielding and thereby producing a contact between clamp part and shielding before the clamp part is inserted into the base part and the connector part is connected. Contacting by means of a clamped position between the clamp braces ensures secure holding and contact in the case of both small and large cable diameters.

Furthermore, the clamp part is configured as a simple component of the holding apparatus. It can be affixed on the cable directly, without further pre-assembly steps, is robust, and can be produced in simple manner, for example from a single layer of material. The holding apparatus is particularly suitable for holding and positioning a single cable.

In an embodiment of a holding apparatus according to the present invention, two clamping wings are provided, which project away from a clamp brace, in each instance, in arc-like manner. Preferably, the clamping wings project away from a clamp brace in opposite directions, in each instance. In this connection, the clamping wings form a kind of arc that surrounds the clamp braces in arc shape, at least in part, and can be biased toward the inside relative to the clamp braces. It is advantageous if the clamping wings span two diametrically opposite regions of a circumference, and therefore also of an inside circumference surface of a base part, when the clamp part is inserted into the base part.

Fundamentally, only a single clamping wing could also be present, which projects away from a clamp brace in arc shape. This wing should then surround the clamp braces in circular shape, to such an extent that it can be reliably clamped into the inner wall of the base part. Furthermore, it is possible that two clamping wings that project away in opposite directions surround the clamp braces in arc shape and overlap at their ends. Also, such clamping wings can be connected with one another at the ends, so that a single clamping wing occurs, which is connected with a clamp brace at each end.

Preferably, clamp braces and clamping wings of the clamp part are oriented in such a manner that the one or the multiple clamping wings surround the clamp braces in a plane that runs through the longitudinal axis of the clamp braces. The arched, bent, or otherwise shaped material line of the clamp part therefore runs in two dimensions, and clamp brace and clamping wing lie in a common plane.

The clamp part of the holding apparatus can have planar clamp braces and clamping wings. For example, the clamp part can consist of a material strip, for example a metal strip, which is brought into the desired shape for forming clamp braces and clamping wings using conventional methods. The surfaces are oriented essentially perpendicular to the plane of the clamp braces and clamping wings. The clamp braces and clamping wings, which are configured in planar manner, therefore have holding surfaces or contact surfaces that can lie against the cable or the base part inside surface. In this way, the seat of the clamp part on the cable is stabilized, and the electrical connection between shielding and base part is improved. The width of the clamp braces and clamping wings or of a material strip preferably amounts to less than the length available from the interior of the base part. Fundamentally, however, a round material, for example a wire, can also be used, in order to form a clamp part according to the invention.

In an embodiment of a holding apparatus according to the present invention, the clamp part preferably comprises two clamp braces that run at least approximately parallel at least in certain locations, with the clamp braces making a transition into one another at a transition end in a transition region, and a clamping wing following at least one of the clamp braces at a wing end. Preferably, a clamping wing is provided on both clamp braces at the wing end. The clamp braces with the transition region can be structured in U shape, for example, with the clamping wings projecting away at the U tips. The clamp braces, which essentially run next to one another, can thereby form an elongated clamp space in which the cable can be accommodated. This clamp space runs essentially radially relative to the arc-shaped clamping wings and has an introduction slot between the wing ends. When the clamp braces are spread apart, the introduction slot opens for insertion of the cable, and the clamp braces are pressed against the cable due to their bias. In this connection, the cable is moved along the longitudinal sides of the clamp part and cannot be damaged by points or edges. Fundamentally, it is possible to configure more than one such pair of clamp braces on the clamp part; for example, four clamp braces can be formed, and two, in each instance, can be brought into a U shape with an introduction slot by means of a transition region. The holding apparatus would thereby be suitable for accommodation of two cables.

The clamp braces can have a bulge in the center region between transition end and wing end, for example in the form of a rounded part, a slight bend, or in an arc shape, with the clamp braces being disposed with mirror symmetry relative to the longitudinal axis of the clamp braces, with regard to the bulge. Therefore, in the elongated space, a shaped holding region occurs, which surrounds the cable on opposite sides and by means of which a cable can be fixed in place in the longitudinal direction of the clamp braces. The cable can therefore assume a defined position within the base part. In this connection, the configuration of the bulge is preferably such that as soon as a cable is introduced between the clamp braces, the bulges clamp around the cable from both sides, and the wing ends of the clamp braces face one another again behind the cable. In other words, the wing ends of the clamp braces have a distance between them, not only in a relaxed state without a cable running through between them but also in a stressed state with a cable running between them, with the clamp braces being bent open around the transition region, which distance is smaller than a cable diameter. Depending on the type of bulge, this can be implemented for cables having different diameters. In this way, it is ensured that the clamping force of the clamp braces exerts a force on the cable in the direction of the bulge. The cable therefore cannot jump out of the clamped position between the clamp braces without application of additional force.

In this embodiment, the transition region forms a bending point for elastically bending the wing ends of the clamp braces apart. The wing ends, from which the clamping wings project away, generally form a bending point for elastic bending of the clamping wings, particularly for bending the clamping wings radially relative to their bending shape in the direction of the clamp braces. The clamp part therefore functions in the sense of a type of leaf spring with three bending points along the spring length. The bending points divide the spring into a first clamping wing, a first clamp brace, a second clamp brace, and a second clamping wing, which run in zigzag manner.

The length of the clamp braces can be dimensioned in such a manner that the transition region between them lies against the inside circumference of the base part as soon as the clamp part has been inserted into the base part. In this case, the transition region serves or the clamp braces serve as a holding point for positioning of the clamp part within the base part, and the clamping wings can be configured to be shorter.

The base part comprises a stop against which the clamp part impacts within the base part, in the axial direction. For this purpose, the stop can project radially away from the inside circumference surface of the base part. The stop surface can additionally serve as a contact surface for an electrical contact between base part and clamp part. Furthermore, the inside circumference surface can serve as an electrical contact surface. The connector part can have a counter-stop against which the clamp part impacts in the axial direction when the base part is connected with the connector part. The counter-stop can also run radially relative to the cable axis, i.e. to the connector part axis. When installing the cable in the holding apparatus, the connector part is affixed onto the base part in the axial direction and connected with it, for example by means of a screw connection. The connector part is set onto or pushed into the base part to such an extent until the clamp part impacts against the stop with a first edge and against the counter-stop with an edge that faces in the opposite direction.

Preferably, the connector part has a shapeable seal as a counter-stop. The seal serves as a stop when the clamp part is fixed in place in its stop position between base part and connector part. In this connection, the seal can be deformed when the connector part is set onto the base part, for example an edge of the clamp part can dig into the seal. Therefore the clamp part can be additionally fixed in place within the base part. The seal can consist of a rubber-like material, for example, for example as a rubber ring or rubber hose piece, which is disposed at least in part within the connector means. Furthermore, the seal can be axially compressed when the connector part is axially connected with the base part, and thereby the inner cross-section of the seal is reduced until the seal encloses the cable that is passed through.

In another variant, a spacer ring or a seal support, which can accommodate a seal at least in part, can serve as a counter-stop. The spacer ring or the seal support can be configured, for example, as a chuck with gripping jaws. In this connection, the gripping jaws can surround the cable when the base part and connector part are connected, and fix the cable in place in the holding apparatus.

A holding apparatus according to the invention essentially comprises only three components or four, including a damping means. The material costs therefore remain low, and installation of a cable within the holding apparatus comprises only a few work steps. Furthermore, a holding apparatus according to the invention has only a short construction, because the clamp part that holds the cable extends essentially in the radial direction and not in the longitudinal direction.

BRIEF DESCRIPTION OF THE DRAWINGS

Preferred embodiments of the invention will be presented below, using the drawings; these serve merely for an explanation and should not be interpreted restrictively. Characteristics of the invention that are disclosed by the drawings should be considered as belonging to the disclosure of the invention individually and in any combination. The drawings show:

FIG. 1: a three-dimensional representation of a holding apparatus according to the present invention, in an assembled state, FIG. 2a: an exploded representation of a first variant of a holding apparatus according to the invention, FIG. 2b: an exploded representation of a second variant of a holding apparatus according to the invention, FIG. 3: a representation from the side of the holding apparatus according to FIG. 1, FIG. 4: a longitudinal section through the holding apparatus along a line B-B of FIG. 3, and FIG. 5: a top view of a clamp part of the holding apparatus according to the present invention.

DETAILED DESCRIPTION OF THE INVENTION

In FIGS. 1, 2a, and 2b, an embodiment of a holding apparatus according to the present invention is shown in an assembled state, in which the holding apparatus is mounted on a cable, and in an exploded representation. The holding apparatus comprises a sleeve-shaped base part 1, a connector part 2 in the form of a retainer nut, and a clamp part 3. Furthermore, a sleeve-shaped seal arrangement is provided, which is accommodated by the connector part 2 and impacts against the base part 1. In a variant of the holding apparatus according to FIG. 2a, the seal consists of two sealing rings 4 and 4' that engage into one another. In the variant of the holding apparatus according to FIG. 2b, a sleeve-shaped seal support 4" is provided, which has the form of a chuck with gripping jaws or lamellae, for example. The seal support 4" can accommodate the seal 4'. For both variants, according to FIGS. 2a and 2b, the base part 1 has a first thread 5 by means of which the holding apparatus can be fastened onto a control cabinet, for example (not shown). Other connection means are possible. The retainer nut 2 is connected with the base part 1, in the embodiment shown, by means of being screwed onto a second thread 6. Here, too, other connection means are possible. A cable 15 having a cable mantle 16 and a shielding or a shielding braid 17 runs through the base part 1 and the connector part 2 in FIG. 1. A sealing ring 18 can be provided in the region of the thread 5 on the base part 1.

In FIG. 5, the clamp part 3 is shown in detail. The clamp part is produced from a continuous material strip, from which two elastically clampable clamp braces 7 having a transition region 8 and two elastically clampable clamping wings 9 are formed. In this connection, the clamp braces 7 and the clamping wings 9 lie in one plane. The transition region 8 forms a bending region in which the clamp braces 7 can be bent away from one another counter to an elastic clamping force. For this purpose, the transition region is configured with a connection surface 14 that connects the two clamp braces 7 at a distance from one another. In this connection, two parts of the clamp part 3, for example, can also be fastened onto one another in the region of the connection surface 14. For example, the clamp part 3 can be joined together with a clamp brace 7 and a clamping wing 9, in each instance, to form the clamp part 3. In this connection, the two symmetrical parts make a transition into one another in a continuous line. The connection surface 14 is also slightly deformed elastically when the clamp braces 7 are bent open, and promotes the bending properties of the clamp braces 7. The transition region 8 with the connection surface 14 and the ends of the clamp braces 7 is configured approximately in U shape. The clamping wings 9 project away from a wing end 10 at an angle, from the clamp braces 7, in opposite directions, in each instance. The clamping wings 9 are bent in such a manner that their ends point in the direction of the transition region 8. The clamping wings 9 together surround the clamp braces 7 in the manner of an arc. In this connection, the clamp braces 7 run at least approximately radially relative to this arc and essentially parallel to one another. An introduction slot 11 is formed between the wing ends 10, which slot can be widened counter to a clamping force of the clamp braces. The clamping wings 9 can be bent toward the clamp braces 7 about a bending point at the wing end 9 of the clamp braces 7, counter to a clamping force.

The clamp braces 7 are configured with mirror symmetry relative to one another, with reference to a longitudinal axis between them, with the distance between the clamp braces 7 varying along the longitudinal direction, so that the clamp braces 7 can take on an optimal holding function. In a center region between the transition region 8 and the wing ends 10, a bulge 12 is formed on the clamp braces 7, in each instance, so that a widened accommodation space 13 for accommodating a cable is formed between the clamp braces 7. The bulge 12 is provided as a bend, in such a manner that the course of the clamp braces 7 is directed in the direction of the wing ends 10, toward the opposite clamp brace, after this bend, so that the introduction slot allows a small distance between the wing ends 10 of the clamp braces 7. Fundamentally, the wing ends 10 of the clamp braces 7 can also touch one another, if no cable is inserted. The introduction slot 11 is therefore narrower than the distance of the bulge 12 of one clamp brace 7 from the opposite clamp brace 7. The bulge 12 is preferably formed in such a manner that the introduction slot 11 is still narrower when the cable is disposed in the accommodation space 13, thereby causing the clamp braces 7 to be widened and the distance in the region of the bulges 12 to be enlarged. In this way, it is ensured that the cable cannot escape through the introduction slot 11 without an exertion of force.

Below the accommodation space 13 or the bulges 12, in the direction of the transition region 8, the distance between the clamp braces 7 narrows. The distance is so small in this region that a cable cannot slip all the way into the transition region 8 in the accommodation space 13. The cable can be positioned between the clamp braces 7, in a predetermined holding position, in the longitudinal direction of the clamp braces 7, and can be securely fixed in place in this position. It maintains this holding position even when inserted into the base part 1.

In FIG. 3, the holding apparatus with base part 1, connector part 2, and cable 15 is shown from a longitudinal side, and in FIG. 4, a longitudinal section through the holding apparatus along the line B-B from FIG. 3 can be seen. The clamp part 3 is set onto the shielding 17, so that the clamp braces 7 securely clutch the shielding 17 from two sides, so that the clamp part 3 is affixed onto the cable 15 in the longitudinal direction, in a defined position. The cable 15 is introduced through the base part 1 with the clamp part 3 until the clamp part 3 comes to lie within the base part 1. In this connection, the clamping wings 9 lie against the inside circumference surface of the base part 1. The clamp part 3 is pushed into the base part 1 to such an extent until the edge of the clamping wings 9 impact against a stop 19, thereby causing the clamp part 3 and the cable 15 to assume a defined longitudinal position relative to the base part 1. The stop 19 can be disposed on the inside circumference of the base part 1, in the form of a step.

The sealing rings 4 and 4', or the seal support 4" and the sealing ring 4' are first partially inserted into one another and pushed into the connector part 2, at least in part. This seal arrangement and the connector part 2 are guided over the cable, so that the connector part 2 can be screwed onto the thread 6 of the base part 1 with an inside thread 22. In this connection, a first edge of the seal arrangement, i.e. a sealing ring 4' or 4' or the seal support 4", forms a counter-stop 20, against which the edge of the clamp part 3 impacts. A second, opposite edge 21 of the seal arrangement, in other words one of the sealing rings 4 and 4' or the seal support 4", impacts against the final counter-stop 20' on the connector part 2. In that the connector part 2 is screwed over the base part 1, a relative movement between base part 1 and connector part 2 along the longitudinal direction of the holding apparatus or of the cable 15 takes place. In this connection, the sealing rings 4 and 4' or the seal support 4" are pressed against the edge of the clamp part 3, so that the latter is pressed against the stop 19 on the base part 1, and against the final counter-stop 20' on the connector part 2. In the variant according to FIG. 2a, the sealing rings 4 and 4' are pushed into one another when this happens, until the sealing ring 4' impacts against a radial edge 23 on the sealing ring 4. In the variant according to FIG. 2b, the sealing ring 4' is pushed into the seal support 4" and impacts against an edge there. When the connector part 2 is screwed further onto the base part 1, the sealing rings 4 and 4' or the seal support 4" and sealing ring 4' are compressed, so that the inside diameter around the cable 15 decreases in size, and encloses the cable firmly, forming a seal.

Before the connector part 2 is tightened on the base part 1 in such a manner that the sealing rings 4 and 4' sit firmly on the cable 15, the cable can be rotated relative to the base part 1, the connector part 2, and within the clamp part 3. In this connection, the surfaces of the clamp braces 7 slide along the shielding 17 without damaging it. When the cable 15 is fixed in place within the holding apparatus, by means of screwing base part 1 and connector part 2 together, the clamp braces 7 of the clamp part 3, which produce the electrical contact with the shielding 17, are not moved relative to the cable 15. The contact with the shielding can therefore be reliably produced. The clamp part 3 once again impacts the stop 19 of the base part 1 and produces the electrical contact with the base part 1 and therefore with a housing with which the base part 1 can be connected. The holding apparatus according to the invention therefore also serves as a contact apparatus for production of a contact between the shielding 17 of the cable 15 and a housing, and serves for grounding the cable.

The invention claimed is:

1. A cable passage for holding a shielding cable and for ensuring reliable contacting between the shielding cable and a holding apparatus, comprising:
   a sleeve-shaped base part (1),
   a connector part (2) connected to the base part (1) in an axial direction to fix an elastically tensile clamp part (3) disposed between the base part (1) and the connector part (2), such that the elastically tensile clamp part (3) is fully within the base part,
   wherein the clamp part (3) includes elastically tensile clamp braces (7) that during assembly receive a circumference of a cable in a radial direction relative to the clamp part (3) and clutch the cable in a mounted position in a radial direction relative to the cable, and one clamping wing (9) projecting away from each of the clamp braces (7) in an outside direction surrounding the clamp braces at least in part in an arc shape and supporting in the mounted position the clamp part (3), elastically tensioned against an inside circumference surface of the base part (1), and wherein the clamp braces (7) and the clamping wings (9) continuously follow one another in the radial direction relative to the cable such that the clamp braces (7) span diametrically opposite regions of the circumference of the cable and the clamping wings (9) span along an inside circumference of the base part (1).

2. The cable passage according to claim 1, wherein the clamp braces (7) and the clamping wings (9) are formed in a one-piece shaped part.

3. The cable passage according to claim 1, wherein two of said clamping wings (9) are provided, which each project away from respective clamp braces (7) in said arc shape, in each instance of the two of said clamping wings.

4. The cable passage according to claim 1, wherein two of said clamping wings (9) are provided, which each project away from respective clamp braces (7) in opposite directions, in each instance of the two clamping wings.

5. The cable passage according to claim 1, wherein each of the clamping wings (9) surrounds the clamp braces (7) in a plane, in said arc shape, at least in part, wherein said plane runs through the longitudinal axis of the clamp braces.

6. The cable passage according to claim 1, wherein the clamp braces (7) and the clamping wings (9) are formed of generally flat stock bent to shape.

7. The cable passage according to claim 1, wherein two clamp braces (7) run at least approximately parallel, at least in part, wherein the clamp braces (7) make a transition into one another in a transition region, and each clamping wing (9) follows a wing end (10) of a respective clamp brace (7).

8. The cable passage according to claim 7, wherein a transition region (8) forms a bending point for elastically bending the wing ends (10) of the clamp braces (7) apart, and that the wing ends (10) form a bending point for elastic bending of the clamping wings (9).

9. The cable passage according to claim 7, wherein the clamp braces (7) run next to one another and form an elongated clamp space that extends generally radially relative to the clamping wings (9) and includes an introduction (11) slot between the wing ends (10).

10. The cable passage according to claim 9, wherein the clamp space forms an accommodation space (13) between bulges (12), which are provided in a center region of the clamp braces (7), in each instance of the clamp braces (7).

11. The cable passage according to claim 7, wherein the wing ends (10) of the clamp braces (7) include a distance between them in a relaxed state without a cable (15) running between them and in a stressed state with a cable (15) running between them, wherein said distance is smaller than a diameter of the cable.

12. The cable passage according to claim 10, wherein a distance between the clamp braces (7) is smaller in a region of the wing ends (10) than in the region of the accommodation space (13).

13. The cable passage according to claim 1, wherein the base part (1) comprises a stop (19) and the connector part comprises a counter-stop (20, 20'), on which the clamp part (3) is impacted, in an axial direction, when the base part (1) is connected with the connector part (2).

14. The cable passage according to claim 13, wherein the connector part (2) includes a shapeable seal (4) or a seal support (4") as a counter-stop (20).

15. The cable passage according to claim 14, wherein the clamp part (3) is configured to produce an electrical contact between a shielding (17) and the base part (1).

16. The cable passage according to claim 15, wherein the clamp part (3) comprises an electrically conductive material.

17. The cable passage according to claim 16, wherein the electrically conductive material is of spring steel, conductive plastic, or plastic with conductive coating.

* * * * *